United States Patent [19]

Satoh et al.

[11] Patent Number: 5,513,160
[45] Date of Patent: Apr. 30, 1996

[54] OPTICAL DISC AND CONTAMINATION DETECTION SYSTEM IN AN APPARATUS FOR RECORDING AND REPRODUCING THE SAME

[75] Inventors: Isao Satoh, Neyagawa; Yoshihisa Fukushima, Osaka; Yuji Takagi, Kadoma; Yasushi Azumatani, Neyagawa, all of Japan

[73] Assignee: Matsushita Electric Industrial Co., Ltd., Kadoma, Japan

[21] Appl. No.: 188,654

[22] Filed: Jan. 28, 1994

Related U.S. Application Data

[63] Continuation of Ser. No. 642,050, Jan. 15, 1991, abandoned.

[30] Foreign Application Priority Data

Jan. 26, 1990 [JP] Japan ................................. 2-017351

[51] Int. Cl.⁶ ..................................................... G11B 7/00
[52] U.S. Cl. ................... 369/47; 369/54; 369/58
[58] Field of Search ............................ 369/54, 58, 44.32, 369/47, 275.2, 275.3, 275.4, 275.5, 48, 50, 44.26

[56] References Cited

U.S. PATENT DOCUMENTS

| | | |
|---|---|---|
| 4,789,974 | 12/1988 | Satoh et al. . |
| 4,896,311 | 1/1990 | Ishihara ..................................... 369/47 |
| 4,969,139 | 11/1990 | Azumatani et al. ...................... 369/54 |
| 4,984,230 | 1/1991 | Satoh et al. ................................ 369/54 |
| 5,031,112 | 7/1991 | Sakai et al. ........................... 250/562 X |
| 5,068,842 | 11/1991 | Naito ........................................ 369/32 |
| 5,075,804 | 12/1991 | Deyring .................................... 369/48 |

*Primary Examiner*—W. R. Young
*Attorney, Agent, or Firm*—Cushman, Darby & Cushman

[57] ABSTRACT

An inspection sector area is disposed on each data sector area of the recording area of an optical disc, and predetermined reference inspection data is recorded in the inspection sector area of a new optical disc before use. The recorded inspection data is reproduced and the number ($E_j$) of data errors which initially occur in the optical disc is detected by comparing the reproduced inspection data with the inspection data during recording and is memorized in the optical disc. During operation, the recorded inspection data is reproduced and compared with the reference data, and the number ($E_m$) of data errors is issued, thereby producing the number of data errors due to particulate contamination as given by a difference between the numbers ($E_j$) and ($E_m$).

2 Claims, 4 Drawing Sheets

OPTICAL DISC AND CONTAMINATION DETECTION SYSTEM IN AN APPARATUS FOR RECORDING AND REPRODUCING THE SAME

This is a continuation of application Ser. No. 07/642,050, filed on Jan. 15, 1991, now abandoned.

FIELD OF THE INVENTION AND RELATED ART STATEMENT

1. Field of the Invention

The present invention relates generally to an optical disc and a recording or reproducing apparatus for the optical disc. More particularly, the invention relates to an optical disc and a recording or reproducing apparatus therefore which can detect particulate contamination of the optical disc.

2. Description of the Related Art

In an optical recording/reproducing apparatus For recording information on an optical disc, the information storage density may be ten times greater or more in comparison with a magnetic disc. The optical disc is recordable by use of a high resolution optical device with a small diameter laser beam and a narrow pitch of tracks on the optical disc.

In particular, a "write-once and read-many optical disc" and a "magneto-optical disc" are of great interest due to their recording and reproducing capabilities and due to their rewriting capability, which cannot realized by a video disc or a compact disc which is exclusively for reproduction.

In the conventional optical recording or reproducing apparatus, a laser beam which is emitted from an optical head is focused on a track of the optical disc which is rotated with a constant angular velocity and is made to trace the track. In the recording process, the intensity of the laser beam is made higher than that in the reproducing process and is modulated in compliance with information to be recorded. In the reproducing process, the intensity of the laser beam is lower than that in the recording process, and light reflected by the optical disc is received and the recorded information is reproduced. In the actual apparatus, the power of the laser beam is 5 mW–10 mW in recording and is about 1 mW in reproducing.

An optical disc made of plastic or glass or another non-conductive material becomes electrostatically charged under continuous operation over a long period of time because of high revolution speeds of over 1800 rpm. Thus, particulates which are suspended in the air adhere to the surface of the optical disc. The laser beam which is applied to the optical disc is absorbed and scattered by the particulates, and the intensity of the laser beam on the surface of the optical disc is significantly weakened. Hence, 5 mW–10 mW of the power of the laser beam which is applied to the optical disc for recording is reduced to 3 mW–6 mW of the power, and complete recording can not be realized. Consequently, amplitude of the reproduced signal is reduced, and bit error rate increases. Furthermore, since recording pits are not formed in the optical disc until a saturated depth, the recorded pits are deteriorated by the influence of environmental variations such as temperature, and the lifetime of the disc is consequently shortened.

In U.S. Pat. No. 4,789,974, for example, a method for detecting particulate contamination of an optical disc is disclosed. According to this patent, plural test signals of differing frequencies are recorded on a predetermined track of the optical disc in advance. The test signals are reproduced by a test signal detecting means during the reproducing process, and then the amplitude of the reproduced test signals are compared with each other. The difference in the amplitudes of the plural test signals are detected, and the status of the surface of the optical disc is determined from the difference of these amplitudes by taking advantage of the difference of susceptibility to reduction in amplitude of high and low frequency components due to particulate contamination.

The predetermined track for recording the test signals is disposed outside the data area on the most outer part of the optical disc, because an electrostatically charged voltage is higher at the outer part of the optical disc and more particulates adhere to the disc in that area. In another case, the test signals may be recorded on the innermost part of the optical disc, since there is no data area there.

However, the particulate contamination of the surface of the optical disc is not restricted to the above-mentioned parts because of complex air flow in a drive mechanism of the recording or reproducing apparatus. The particulate contamination on the data area of the optical disc can not be determined from the particulate contamination on the outermost part or the innermost part of the optical disc.

OBJECT AND SUMMARY OF THE INVENTION

An object of the present invention is to provide an optical information recording or reproducing apparatus which can correctly detect a defect due to particulate contamination of any part of the entire surface of the data area of an optical disc.

The optical information recording and reproducing apparatus in accordance with the present invention comprises:

a recording/reproducing apparatus comprising:

an optical head for recording information on an optical disc and for reproducing the information from the optical disc, control means for controlling the optical head to trace a predetermined track of the optical disc with a laser light beam which is emitted from the optical head, means for dividing the recording area of the optical disc into block control table for recording a disc control information such as label data block information, a substitution sector area for substituting a defect sector having a defect, a mapping sector area for storing designating address map information for designating a correspondence between the defect sector and the substitution sector, data sector areas for recording data and inspection sector areas for recording inspection data, recording means for recording inspection data in the inspection sector areas, comparing means for comparing reproduced inspection data with recording inspection data, and calculation means for calculating the number of errors on the basis of the output of the comparing means.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
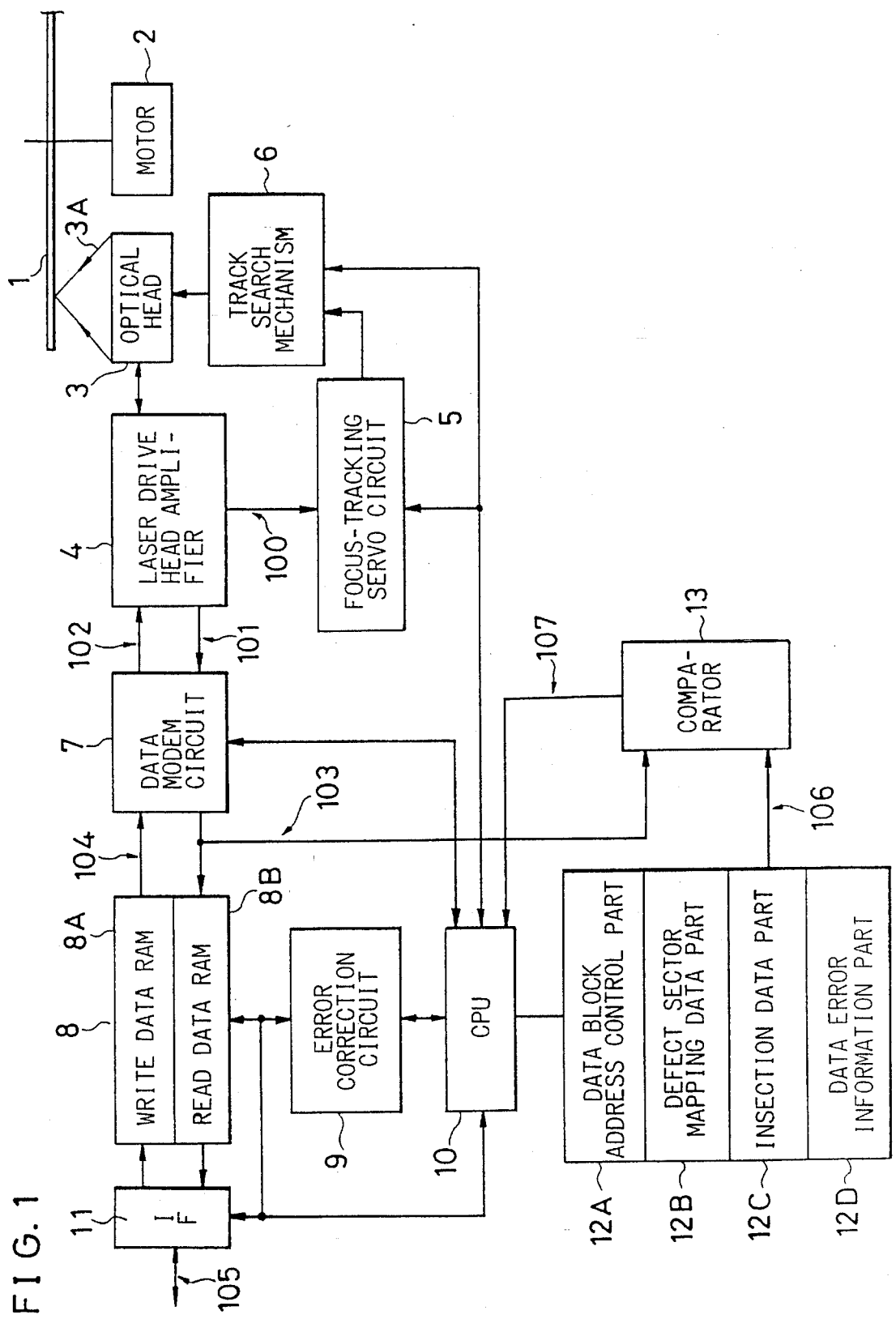
FIG. 1 is a block diagram of an embodiment of an optical information recording or reproducing apparatus in accordance with the present invention.

FIG. 1 is a block diagram of an optical information recording or reproducing of an embodiment in accordance with the present invention. Referring to FIG. 1, an optical disc 1 is rotated by a motor 2. An optical head 3 is located under the optical disc 1, a laser beam 3A is applied to the optical disc from the optical head 3, and a light reflected from the optical disc 1 is received thereby. A laser drive and head amplifier part 4 comprise a laser drive part for driving the optical head 3 and a head amplifier part for amplifying a focus tracking error signal 100 to be given to a focus-tracking servo circuit 5 and a read signal 101 which is sensed by the optical head 3. The focus-tracking servo circuit 5 outputs a signal for driving actuators of the optical head 3 to focus the laser beam on a track of the optical disc 1 and to hold the laser beam on the track. A track search mechanism 6 comprises a linear motor for accessing the optical head 3 to a predetermined track.

In a data modulation-demodulation circuit 7 (hereinafter referred to as MODEM circuit), a write data signal 104 output from a write data RAM 8A is digitally modulated, and the modulated signal is applied to the laser drive head amplifier 4 as a write signal 102. A read signal 101 from the laser drive head amplifier 4 is demodulated by the MODEM circuit 7, and a read data signal 103 is output. A memory 8 (RAM) comprises a write data RAM 8A for storing the write data and a read data RAM 8B for storing the read data. An error correction circuit 9 attaches an error correction code to the write data, and correct errors of the read data signal 103. A CPU 10 controls the whole system. An interface circuit 11 serves as an interface for transmitting or receiving data to or from a host CPU (not shown) through a data bus 105.

A memory 12 for controlling a defect sector and an inspection sector area of the optical disc comprises a data block address control part 12A, defect sector mapping data part 12B, inspection data part 12C and a data error information part 12D. A comparing circuit 13 compares the read data signal 103 with an inspection data signal 106 and outputs a noncoincidence signal 107 to the CPU 10.

Figure 2:
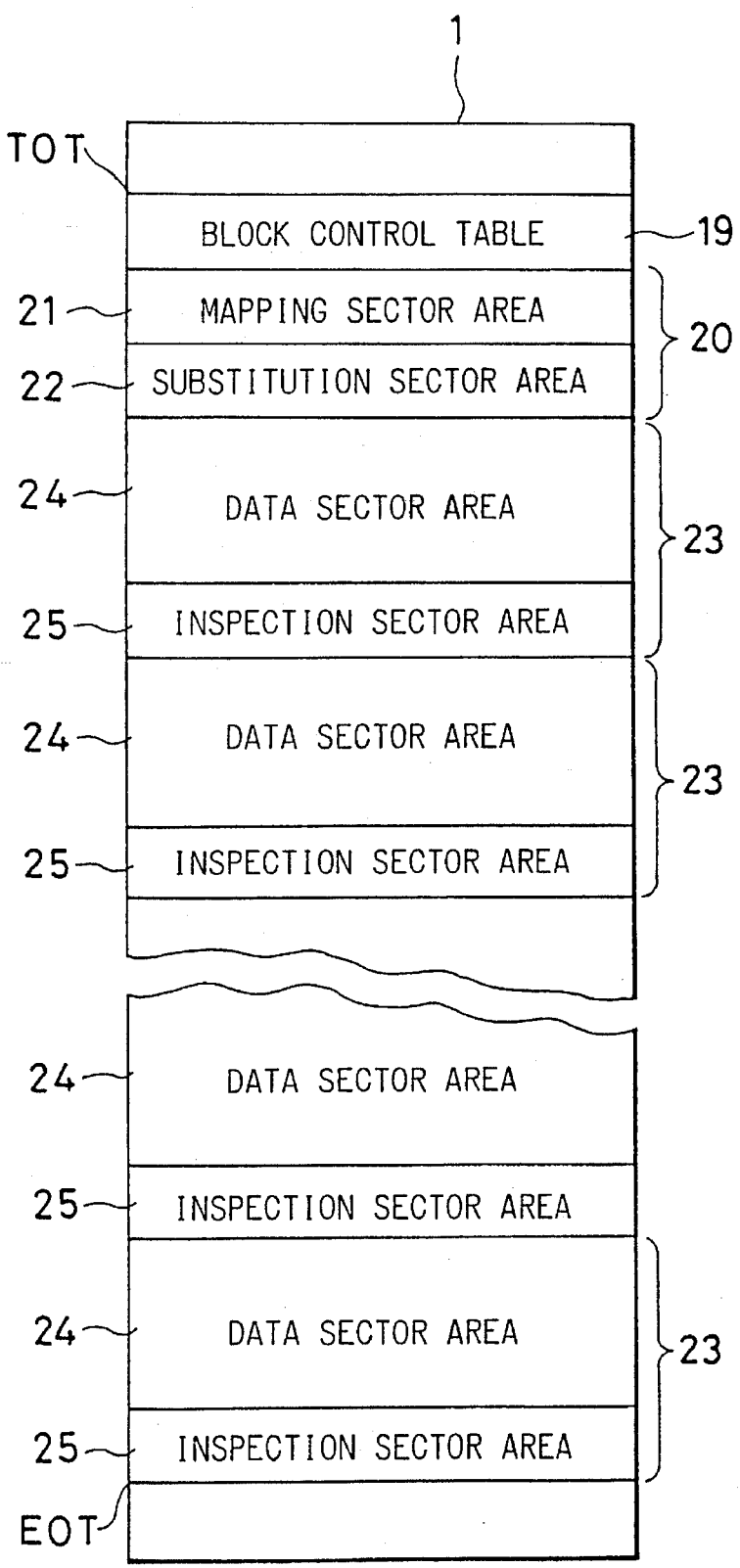
FIG. 2 is the chart of a surface layout of an optical disc of a first embodiment in accordance with the present invention.

FIG. 2 is a surface layout chart of a first embodiment of the optical disc in accordance with the present invention. In the first embodiment of the optical disc, control of all defect sectors is accomplished in a defect sector control area 20, and it is effective when only few defects exist in the optical disc.

Referring to FIG. 2 which schematically shows sectors of the optical disc in piled square blocks, a recordable area of the optical disc 1 which is shown by a start track position TOT (e.g. of the outermost track) and an end track position EOT (e.g. of the innermost track) is divided into a block control table 19, a defect sector control area 20 having a mapping sector area 21 and a substitution sector area 22 and a plurality of data blocks 23. The data blocks 23 are labeled with B1, B2, ..., BN from the uppermost one to the lowest one in FIG. 2. Each data block 23 comprises a data sector area 24 and an inspection sector area 25. Disc control information such as a label of the optical disc 1 and data block information are recorded in the block control table 19. A data block 23 is a unit in control of a defect sector. The mapping sector area 21 has an address map information by which correspondence between the defect sectors of all data blocks 23 and the substitution sectors is made. The substitution sector area 22 substitutes the defect sector of the data sector area 24 of entire data blocks 23.

Figure 3:
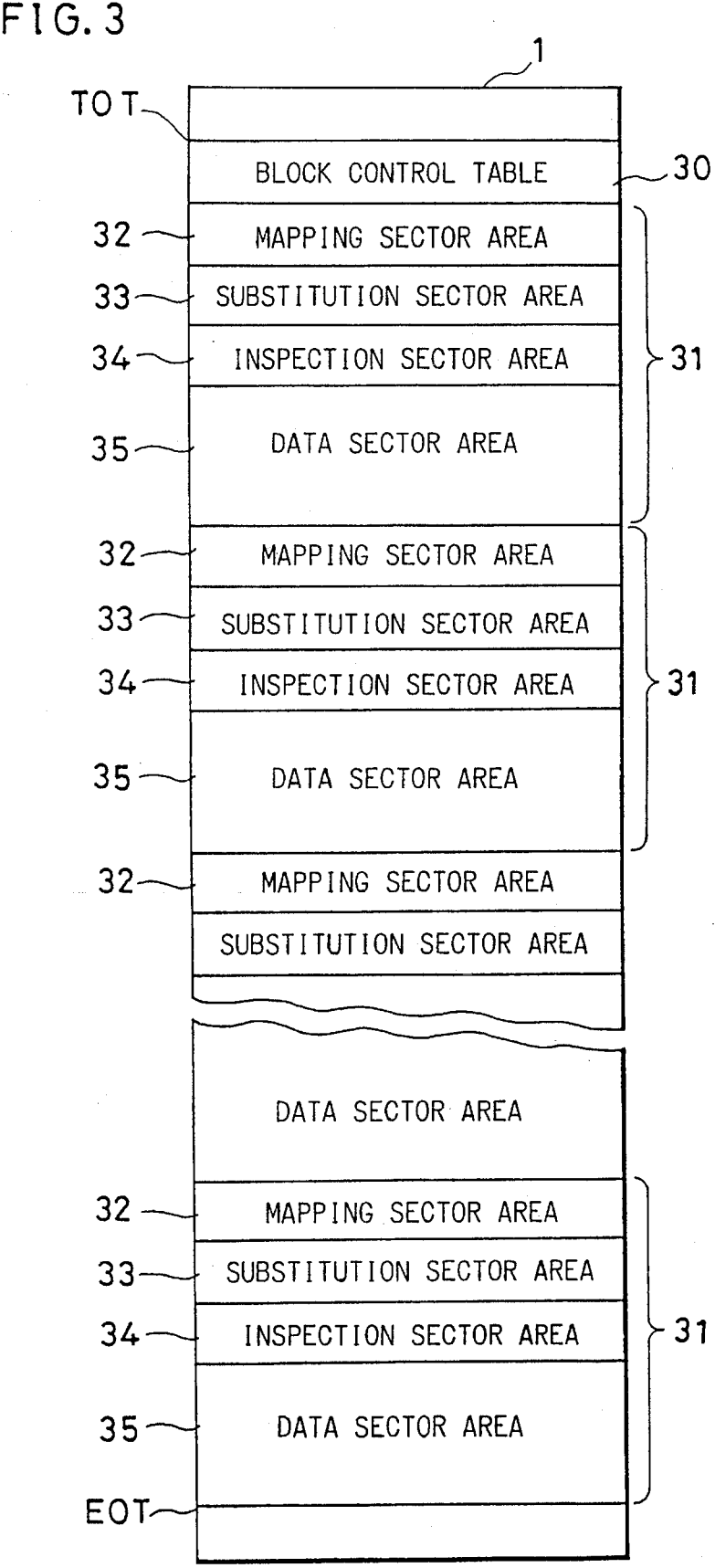
FIG. 3 is the chart of a surface layout of an optical disc of a second embodiment in accordance with the present invention.

FIG. 3 is chart of a surface layout of the second embodiment of the optical disc. Similarly to FIG. 1, the sectors of the optical disc are schematically shown by piled square blocks. The recording area of the optical disc 1 from the start track position TOT to the end track position EOT is divided into a block control table 30 and a plurality of data blocks 31 which are units for controlling defect sectors. The respective data blocks 31 are labeled with B1. B2, ..., BN from the uppermost one to the lowermost one. The block control table 30 stores the disc control information of the label of the optical disc 1 and data block information or the like.

Each data block 31 comprises a mapping sector area 32, a substitution sector area 33, an inspection sector area 34 and a data sector area 35. The mapping sector area 32 stores correspondence address map information between a defect sector of each data block 31 and a substitute sector in the substitution sector area 33. For the defect sector control, a defect sector having a defect in the data sector area 35 of a data block 31 which is traced by the optical head 3 is substituted by a substitution sector of the substitution sector area 33, and the address map information corresponding to the substitute sector is recorded in the mapping sector area 32.

In the second embodiment as shown in FIG. 3, since defect sector control information is provided in each data block 31, the memory capacity of the optical disc apparatus for storing control information such as a mapping information can be reduced. The second embodiment is preferable to the case having comparatively many defects.

Referring to FIG. 1, FIG. 2 and FIG. 3, inspection data is recorded in inspection sector areas 25 or 34, respectively, and the particulate contamination of the surface of the optical disc i is inspected by reproducing the recorded inspection data.

Operation of the embodiment of the recording or reproducing apparatus of the optical disc is elucidated hereafter. Referring to FIG. 1, after setting of the optical disc i on the motor 2, the laser beam of the optical head 3 is focused to the recording layer of a track of the optical disc 1 by a control signal output from the focus-tracking servo circuit 5 which is controlled by the CPU 10. Then, the focus-tracking servo circuit 5 is activated, and the track address of the track is read by the optical head 3. The optical head 3 is moved to search the block control table 19 by the track search mechanism 6 and the addresses of a data sector area 24, the substitute sector area 22 and an inspection sector area 25 which are shown in FIG. 2 are detected.

Then, the inspection data memorized in the inspection data part 12C of the memory 12 (shown in FIG. 1) is recorded in the inspection sector area 25 of the each data block 23 of the optical disc 1 by control of the CPU 10. In this process, the inspection data is transmitted to the write data part 8A of the memory 8 and is coded with an error correction code by error correction circuit 9, and a write data signal 104 is output to the data MODEM circuit 7. A sector address is reproduced from a read signal 101 by the data MODEM circuit 7, and when a predetermined sector is detected, the write signal 102 is applied to the laser drive head amplifier 4. The intensity of the laser beam of the optical head 3 is modulated by the laser drive head amplifier 4, and the write data signal 102 is recorded on the optical disc 1.

Subsequently, the recorded signal in the inspection sector area 25 is detected by the optical head 3 and is applied to the data MODEM circuit 7 through the laser drive head amplifier 4. The signal is demodulated by the data MODEM circuit 7, and a read data signal 103 is output. The read data signal 103 is stored in the read data RAM 8B of the memory 8. The data of the read data RAM 8B is compared with the inspection data stored in the inspection data part 12C by the comparator part 13. In the event that an error is detected by the above-mentioned comparison, a noncoincidence signal 107 is output and is applied to the CPU 10, and the number of errors is counted in the CPU 10. The number of errors is memorized in the data error information part 12D.

After completion of the recording and reproducing of the inspection data with respect to the inspection sector areas 25 of all the data blocks 23 (label B1, . . . , label BN), the number of errors in each block 23 is read out from the data error information part 12D by operation of the CPU 10, and the data which represents the rate of error distribution over the entire surface of the optical disc 1 is output. The error distribution rate may be defined as the ratio of the number of reproduced errors to number of recorded pits, for example. A reference value of the error distribution rate is, for example, $10^{-4}$. This means that on the average, one error is detected for every $10^{-4}$, or ten thousand bits of reproduced data. The error distribution rate is compared with the reference value $10^{-4}$. When the error distribution rate exceeds the reference value $10^{-4}$, for example, an alarm is issued by the operation of the CPU 10.

According to these embodiments, the recording area of the optical disc 1 is divided into a plurality of data blocks, and each block has a data sector area and an inspection sector area. During the inspection of each data block, the inspection data is recorded and reproduced in the inspection sector area, and the number of errors is detected on the basis of the reproduced inspection data. Therefore, the particulate contamination of the entire surface of the optical disc is inspected.

In the second embodiment of the surface layout of the optical disc 1 shown in FIG. 3, the mapping sector area 32 and substitution sector area 33 which has a similar area to the mapping sector area 21 and substitution sector area 22 of the first embodiment, respectively, are disposed in each data block 31. The operation of the second embodiment is almost the same as that of the first embodiment.

Figure 4:
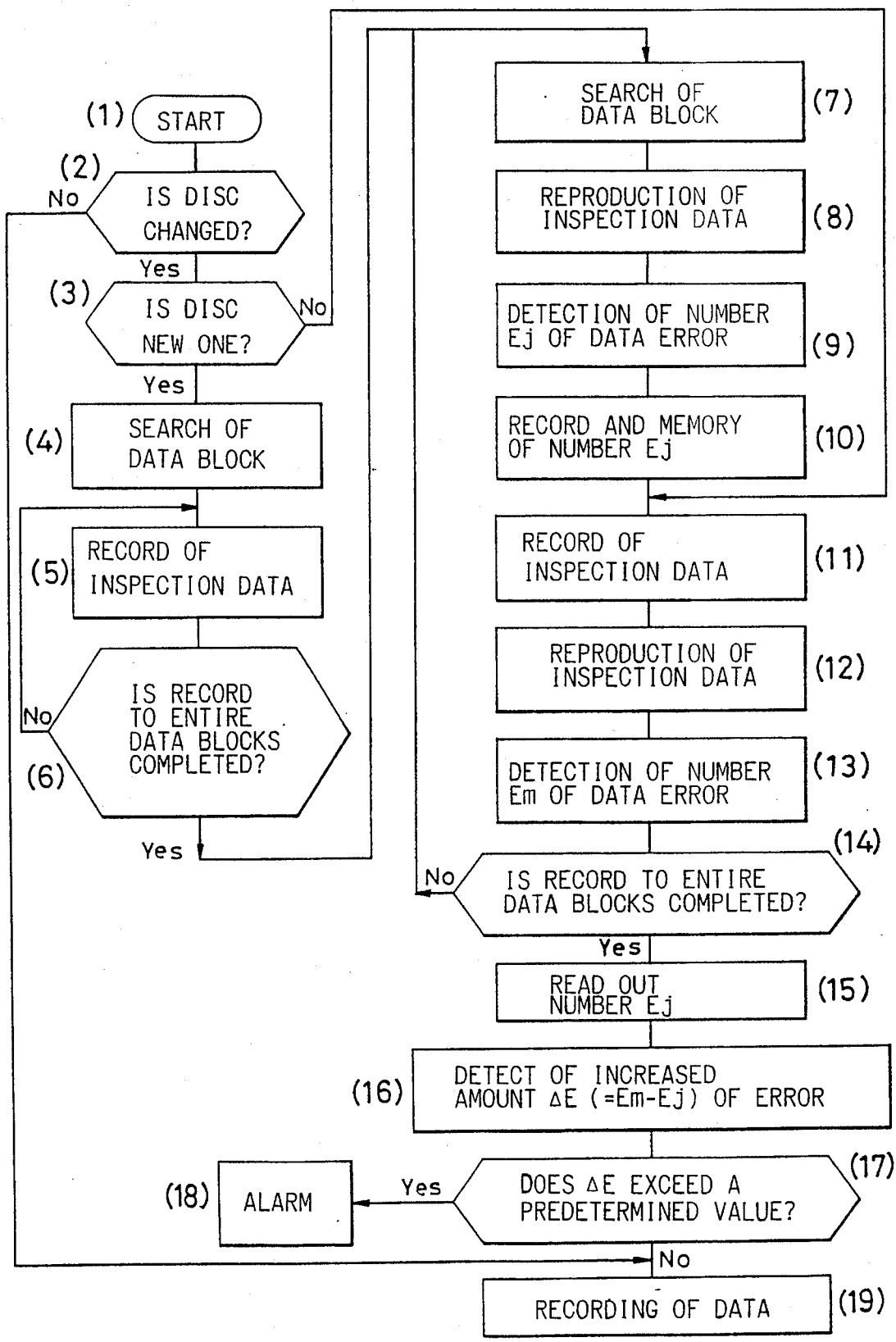
FIG. 4 is a flow chart of operation of the embodiment of the recording or reproducing apparatus.

FIG. 4 is a flow chart of the operation of the optical disc recording or reproducing apparatus.

In Step 2, change of an optical disc in the recording or reproducing apparatus is checked. If the optical disc is not changed, the flow advances to Step 19 to record data.

In Step 3, when the optical disc set in the recording or reproducing apparatus is a new one, the flow advances to Step 4, and the block control table 19 or 30 and the data block 23 or 31 are searched. When the optical disc is not new, the flow advances to Step 11.

In Step 5, inspection data is recorded in the inspection sector area 25 or 34.

In Step 6, completion of the recording operation of the inspection data to all data blocks is checked. After completion of the recording operation, the flow advances to Step 7.

In Step 7, the data block 23 or 31 is searched, and the inspection sector area 25 or 34 is detected.

In Step 8, the inspection data in the inspection sector area 25 or 34 is reproduced.

In Step 9, the number EJ of data errors is detected by comparing the reproduced inspection data with the inspection data in the inspection data part 12C. The number EJ represents the "initial defects" of the optical disc 1.

In Step 10, the number EJ is recorded in the block control table 19 or 30, and is memorized in the data error information part 12D of the memory 12.

In Step 11, the inspection data of the inspection data part 12C is recorded in the inspection sector area 25 or 34.

In Step 12, the inspection data recorded in Step 11 is reproduced.

In Step 13, the number Em of data errors is detected by comparing the reproduced inspection data with the inspection data in the inspection data part 12C.

In Step 14, the completion of inspection with respect to entire data blocks is checked.

In Step 15, the number EJ is read out from the data error information part 12D.

In Step 16, after the completion of the inspection, an increased amount $\Delta E$ of the data error is obtained by calculating a difference between the number EJ and the number Em (Em−Ej=$\Delta E$, E, J and m: 1, 2, . . . N).

In Step 17, the increased amount $\Delta E$ is compared with a predetermined value which is twice the number Ej, for example. When the increased amount $\Delta E$ exceeds the predetermined value, an alarm is generated in Step 18. When the increased amount $\Delta E$ is smaller than the predetermined value, data is recorded in the data sector area 23 or 35 in Step 19.

In the first and the second embodiments of the surface layout of the optical disc 1, processing software for controlling the data sector area is simplified by matching the sector number of the data block 23 with the sector number of sector of the defect sector control area.

The number of data errors can be detected from an error correction code as described in the document "ERROR-CORRECTION CODES" by W. W. Peterson and E. J. Weldon, (1975, SECOND ED, THE MIT PRESS, Chapter 9, An Error-Correction Processor, Page 283–288).

The first and second embodiments described above are applicable to optical discs having spiral tracks or concentric circular tracks.

In the ZBR (zone bit recording) format and in the MCAV (modified constant angular velocity) format for increasing the recording capacity of optical discs of the type presently known in the art, the number of sectors in one full track is stepwisely increased from the inner part toward the outer part of the optical disc 1. Thereby, the data recording density is made uniform. The first and second embodiments of the surface layout of the optical disc 1 are applicable to these formats by matching the data block 23 or 31 with a block unit of the ZBR format or MCAV format. In the above-mentioned case, the section number of the inspection sector area is stepwisely increased from the inner part toward the outer part of the optical disc. The inspection data is recorded in the full track of the inspection sector area from the inner part to the outer part of the optical disc 1. In the ZBR format, the program for processing the inspection data is simplified by performing the defect sector control with respect to each block unit of the ZBR format.

Although the invention has been described in its preferred form with a certain degree of particularity, it is understood that the present disclosure of the preferred form may changed in the details of construction and the combination and arrangement of parts may be changed without departing from the spirit and the scope of the invention as hereinafter claimed.

What is claimed is:

1. A contamination detection system within a recording and reproducing apparatus comprising: an optical disc having a recording area;

an optical head for emitting a laser light beam and for recording information on said optical disc and for reproducing said information from said optical disc;

control means for controlling said optical head to trace a predetermined track of said optical disc with said laser light beam;

first dividing means for dividing said recording area of said optical disc into a block control table for recording disc control information, a substitution sector area for substituting a defect sector having a defect, a mapping sector area for storing address map information for designating a correspondence between said defect sector and said substitution sector, and a plurality of data blocks, each data block having a data sector area for recording data and an inspection sector area for recording inspection data;

recording means for recording inspection data in said inspection sector area of each data block of a brand-new optical disc;

first comparing means for comparing reproduced inspection data of said brand-new optical disc with recording inspection data in each data block and for providing an indication of said comparison as a first number of data errors with respect to said each data block;

recording means for recording inspection data in said inspection sector areas of said optical disc when said optical disc is applied to successive use after detection of said first number of data errors;

second comparing means for comparing said first number of data errors with a second number of data errors based on reproduced inspection data in each data block after repetition of use of said optical disc;

first calculating means for calculating an increased amount of said data errors on the basis of a difference between said first number of data errors and said second number of data errors with respect to each data block;

third comparison means for comparing said increased amount of said data errors with a predetermined value; and control means for recording data in said data sector in the event that said increased amount is smaller than said predetermined value.

2. A contamination detection system within a recording and reproducing apparatus as claimed in claim 1, further comprising:

second dividing means for dividing said recording area of said optical disc into a block control table and a plurality of data blocks, each data block having a mapping sector area, a substitution sector area, an inspection sector area and a data sector area.

* * * * *